United States Patent [19]

Kristen et al.

[11] Patent Number: 4,582,943

[45] Date of Patent: Apr. 15, 1986

[54] STABILIZATION OF POLYALKYLENE GLYCOLS

[75] Inventors: Ulrich Kristen, Rheinfelden; Hermann F. Angerer, Biel-Benken; Franz Regenass, Liestal, all of Switzerland

[73] Assignee: Ciba-Geigy Corporation, Ardsley, N.Y.

[21] Appl. No.: 680,683

[22] Filed: Dec. 12, 1984

[30] Foreign Application Priority Data

Dec. 23, 1983 [CH] Switzerland .................. 6881/83

[51] Int. Cl.$^4$ .................. C07C 41/00; C07C 41/46
[52] U.S. Cl. .................. 568/582; 252/52 A; 568/580; 568/701
[58] Field of Search .................. 568/701, 854, 868, 869, 568/580, 582; 252/52 A

[56] References Cited

U.S. PATENT DOCUMENTS

| 2,687,377 | 8/1954 | Stewart et al. | 568/582 |
| 2,790,779 | 4/1957 | Splvack | 252/34.7 |
| 3,274,149 | 9/1966 | Berardinell | 568/582 |
| 3,637,865 | 1/1972 | Haring | 568/582 |
| 3,652,411 | 3/1972 | Commichou | 252/34.7 |
| 4,007,230 | 2/1977 | Hinze | 568/582 |
| 4,435,603 | 3/1984 | Cornils | 568/701 |
| 4,444,676 | 4/1984 | Statton et al. | 568/582 |

FOREIGN PATENT DOCUMENTS

| 38410 | 1/1959 | Japan | 568/701 |
| 2072171 | 9/1980 | United Kingdom | 568/701 |

Primary Examiner—Werren B. Lone
Attorney, Agent, or Firm—Harry Falber

[57] ABSTRACT

A stabilizer system containing at least one compound of the formula I

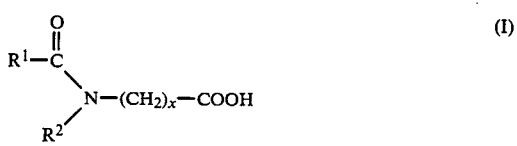

and one compound of the formula II

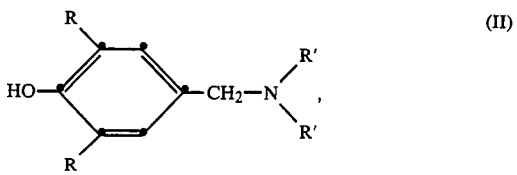

the substituents $R^1$, $R^2$, R and R' having the meanings defined in the text, and x being 1 to 3. This stabilizer system is suitable for use as an additive to a polyalkylene glycol base liquid for preventing the formation of rust, especially on iron-containing surfaces, the use of these lubricant compositions being possible also in the high-temperature range.

6 Claims, No Drawings

STABILIZATION OF POLYALKYLENE GLYCOLS

The invention relates to novel stabiliser systems and to their use in polyalkylene glycols.

To improve the performance characteristics of lubricants, there are generally added to them additives. There is in particular a need for additives which would ensure the corrosion and oxidation stability of lubricants at elevated working temperatures. To be especially emphasised in this respect is the prevention of the formation of rust on metal surfaces, particularly iron-containing surfaces, which come into contact with lubricants, for moisture can penetrate into any lubricant system. Furthermore, the presence of rust can greatly increase the rate of oxidative damage occurring as a result of a lubricant.

From the U.S. Pat. No. 3,652,411 are known lubricant compositions having improved stability to oxidation and to temperature; however, an extremely complicated lubricant formulation is involved in this case. It is likewise known, from the U.S. Pat. No. 2,790,779, that an N-acylsarcosine compound in a lubricant composition contributes towards the prevention of rust. This effect produced by the acylsarcosine compounds does not however satisfy in every respect the demands to be made at present with regard to corrosion protection.

It has now been found that the stabiliser system of the present invention ensures an excellent protection from corrosion, particularly for iron and iron-containing alloys, even in the high-temperature range. It has now been found that, in spite of the relatively low level of effectiveness of the individual components of the system, their combination surprisingly brings into play a marked degree of synergism; to be emphasised in this connection moreover is the intensification of the effect caused by the N-acylsarcosine compound.

The invention relates to a stabiliser system containing at least one compound of the formula I

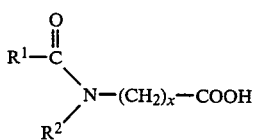

wherein $R^1$ is $C_4$-$C_{22}$-alkenyl, $R^2$ is $C_1$-$C_4$-alkyl, and x is an integer from 1 to 3, and one compound of the formula II

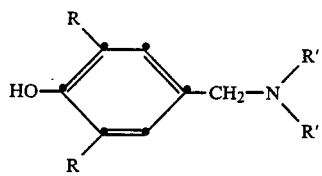

wherein R is $C_1$-$C_6$-alkyl and R' is $C_1$-$C_8$-alkyl.

As $C_4$-$C_{22}$-alkenyl, $R^1$ is $C_{13}$-$C_{17}$-alkenylmethyl; the radical $R^1$ can be straight-chain or branched-chain: it is however preferably straight-chain; it contains preferably 1 or 2 double bonds, especially however one double bond, so that there applies the general expression $C_nH_{2n-1}$, wherein n is 14 to 18, in particular 17; more especially however $R^1$ is the oleic acid radical.

$R^2$ is preferably methyl or ethyl, especially methyl, and x is preferably 1.

R can be straight-chain or branched-chain; it is preferably $C_1$-$C_4$-alkyl, particularly tert-butyl. The radical R' is preferably $C_1$-$C_4$-alkyl, especially methyl or ethyl, more especially however methyl.

The additives are added to a base lubricant from the polyalkylene glycol class by thorough intimate mixing at temperatures of between 40° and 80° C.

The polyalkylene glycol base liquid, in which the stabiliser systems according to the invention are applied, embraces compounds which are represented by the general formula $$HO(-Q-O-)_n H,$$

wherein Q and n depend on the particular educts used. They are reaction products of ethylene oxide and/or propylene oxide with a mono- and/or polyvalent alcohol having reactive OH groups as starting molecule. The molecular weight of the polyalkylene glycols is in general within a range of 200 to 20,000.

The stabiliser system according to the invention can be applied in the polyalkylene glycol base liquid in varying ratios. The compounds of the formulae I and II are each used in an amount of 0.01 to 5.0% by weight, relative to the total weight of the lubricant composition, preferably however 0.01 to 3.0% by weight, and particularly preferably 0.1 to 2.0% by weight.

The compounds of the formulae I and II in the lubricant composition according to the invention can be used in the ratio of 1:10 to 10:1.

The compounds of the formulae I and II are known and can be produced by known methods, as described for example in the U.S. Pat. No. 2,790,779.

The lubricant composition can additionally contain further additives, which are added for the purpose of improving the performance characteristics. These additives are preferably antioxidants, metal passivators and rust inhibitors, as well as other known additives, such as antiwear agents, high-pressure additives and agents for reducing friction.

The employed amount of these additives is variable. It depends on the chemical structure of the additives and on the field of application and is known to those skilled in the art.

Examples of antioxidants are:

(a) alkylated and non-alkylated aromatic amines and mixtures thereof, for example: dioctyldiphenylamine, mono-t-octylphenyl-α- and -β-naphthylamines, phenothiazine, dioctylphenothiazine, phenyl-α-naphthylamine and N,N'-di-sec-butyl-p-phenylenediamine;

(b) sterically hindered phenols, for example: tetrakis(-methylene-3-(3,5-di-tert-butyl-4-hydroxyphenyl)propionate)-methane, 2,6-di-tert-butyl-p-cresol, 4,4'-bis-(2,6-diisopropylphenol), 2,4,6-triisopropylphenol, 2,2'-thio-bis-(4-methyl-6-tert-butylphenol) and 4,4'-methylene-bis-(2,6-di-tert-butylphenol);

(c) alkyl-, aryl - or alkarylphosphites, for example: trinonylphosphite, triphenylphosphite and diphenyldecylphosphite;

(d) esters of thiodipropionic acid or thiodiacetic acid, for example: dilaurylthiodipropionate or dioctyl-thiodiacetate;

(e) salts of carbamic and dithiophosphoric acids, for example: antimony-diamyldithiocarbamate and zinc-diamyldithiophosphate; and (f) a combination of two or more antioxidants of the above additives, for example: an alkylated amine and a sterically hindered phenol.

Examples of metal passivators are:

(a) for copper, for example: benzotriazole and derivatives, tetrahydrobenzotriazole, 2-mercaptobenzotriazole, 2,5-dimercaptothiadiazole, salicylidene-propylenediamine and salts of salicylaminoguanidine;

(b) for lead, for example: sebacic acid derivatives, quinizarine and propyl gallate; and (c) a combination of two or more of the above additives.

Examples of rust inhibitors are:

(a) organic acids and esters thereof, metal salts and anhydrides, for example: sorbitan mono-oleate, lead naphthenate and dodecenylsuccinic acid anhydride;

(b) nitrogen-containing compounds, for example:
   I. primary, secondary or tertiary aliphatic or cycloaliphatic amines and amine salts of organic and inorganic acids, for example: oil-soluble alkylammonium carboxylates;
   II. heterocyclic compounds, for example: substituted imidazolines and oxazolines;

(c) phosphorous-containing compounds, for example: amine salts of phosphoric acid partial esters, (d) sulfur-containing compounds, for example: barium dinonylnaphthalene sulfonates and calcium petroleum sulfonates; and (e) combinations of two or more of the above additives.

Examples of additives providing protection from wear are, for example:

compounds containing sulfur and/or phosphorus and/or halogen, such as vegetable oils treated with sulfur, zinc dialkyldithiophosphates, tritolyl phosphate, chlorinated paraffins, and alkyl and aryl disulfides.

By virtue of their excellent properties for protection against corrosion, the compositions according to the invention are particularly suitable for lubricant applications, which include the protection of metal surfaces, especially iron-containing surfaces. Preferred fields of application are in the high-temperature range, primarily for use in the lubrication of calenders and gears.

An additional important advantage of the stabiliser systems according to the invention is that the additive components in the polyalkylene glycols have an extremely high stability in solution.

The invention is further illustrated by the following Examples.

EXAMPLE 1

The base liquid is used in this case without additive, the term 'base liquid' signifying here a polyalkylene glycol mixture.

EXAMPLE 2

There is produced a lubricant composition according to the invention by the mixing together of the following components: a base liquid according to Example 1 and 1.0% by weight of a compound of the formula

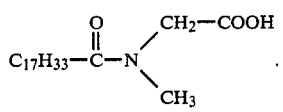

EXAMPLE 3

There is produced a lubricant composition according to the invention by the mixing together of the following components: a base liquid according to Example 1 and 1.0% by weight of a compound of the formula

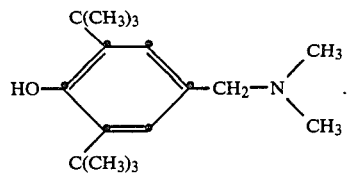

EXAMPLE 4

There is produced a lubricant composition according to the invention by the mixing together of the following components: a base liquid according to Example 1 and 0.5% by weight of a compound of the formula

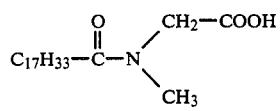

and 0.5% by weight of a compound of the formula

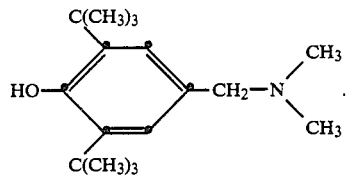

In order to demonstrate the synergistic effect of the additive combinations according to the invention, in respect of corrosion protection in the lubricants, the lubricant compositions of the above Examples are tested by application of the ASTM D 665 A test with regard to the prevention of corrosion.

TABLE 1

| Testing of corrosion protection in the case of stabilised and nonstabilised polyalkylene glycols by application of the test according to ASTM D 665 A. | | | | |
|---|---|---|---|---|
| Example No. of the lubricant formulation | 1 | 2 | 3 | 4 |
| Assessment of corrosion | 3 | 3 | 3 | 0 |

An assessment of the extent of corrosion is made on the basis of a scale of values extending from zero, the point where no corrosion occurs, up to levels of corrosion denoted by stages 1, 2 and 3.

It is shown that the lubricant composition containing a compound of the formula I and a compound of the formula II (Example No. 4) exhibits, in terms of protection against corrosion, a synergistic effect not to be expected in the light of the degree of corrosion protection provided by the other lubricant compositions (Examples Nos. 1-3).

What is claimed is:

1. A stabiliser system containing at least one compound of the formula I

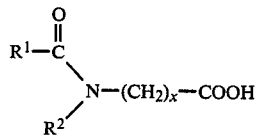

wherein $R^1$ is $C_4$–$C_{22}$-alkenyl, $R^2$ is $C_1$–$C_4$-alkyl, and x is an integer from 1 to 3, and one compound of the formula II

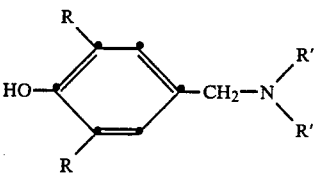

wherein R is $C_1$–$C_6$-alkyl, and R' is $C_1$–$C_8$-alkyl.

2. A stabiliser system according to claim 1, wherein $R^1$ in the formula I is $C_{14}$–$C_{18}$-alkenyl, and $R^2$ is methyl or butyl; and R in the formula II is tert-butyl and R' is methyl or ethyl, and x is 1.

3. A stabiliser system according to claim 2, wherein $R^1$ in the formula I is the alkenyl radical —$C_{17}H_{33}$, and $R^2$ is methyl, and R' in the formula II is methyl.

4. Polyalkylene glycols containing a stabiliser system according to claim 1.

5. Polyalkylene glycols according to claim 4, containing a compound of the formula I and a compound of the formula II according to claim 1 in an amount each of 0.01 to 5.0% by weight, relative to the total weight of the composition.

6. Method for stabilising polyalkylene glycols by adding the stabiliser system according to claim 1 to said polyalkylene glycols.

* * * * *